United States Patent [19]
Lukas

[11] 3,788,632
[45] Jan. 29, 1974

[54] WORK-POSITIONING TABLE

[76] Inventor: George N. Lukas, 5009 N. Sheridan Rd., Chicago, Ill. 60640

[22] Filed: Sept. 1, 1971

[21] Appl. No.: 177,054

[52] U.S. Cl. ............................................... 269/20
[51] Int. Cl............................ B23q 3/02, B25b 1/18
[58] Field of Search ...................................... 269/20

[56] References Cited
UNITED STATES PATENTS

| | | | |
|---|---|---|---|
| 2,712,248 | 7/1955 | Gustafson | 269/20 UX |
| 2,874,599 | 2/1959 | Charlat | 269/20 UX |
| 3,324,827 | 6/1967 | Powell et al. | 269/20 X |

*Primary Examiner*—James L. Jones, Jr.
*Assistant Examiner*—E. F. Desmond
*Attorney, Agent, or Firm*—Stone, Zummer & Aubel

[57] ABSTRACT

A work-positioning table for positioning a work piece relative to a tool to perform an operation on a selected portion of the work piece. The table includes a base. A work carrier is movably mounted on the base. A holder is mounted on the base and is engageable with the work carrier. A fluid-operated cylinder having a ram connected thereto is engageable with the work carrier to force the work carrier into frictional holding engagement with the holder for holding the work carrier in any selected position.

15 Claims, 8 Drawing Figures

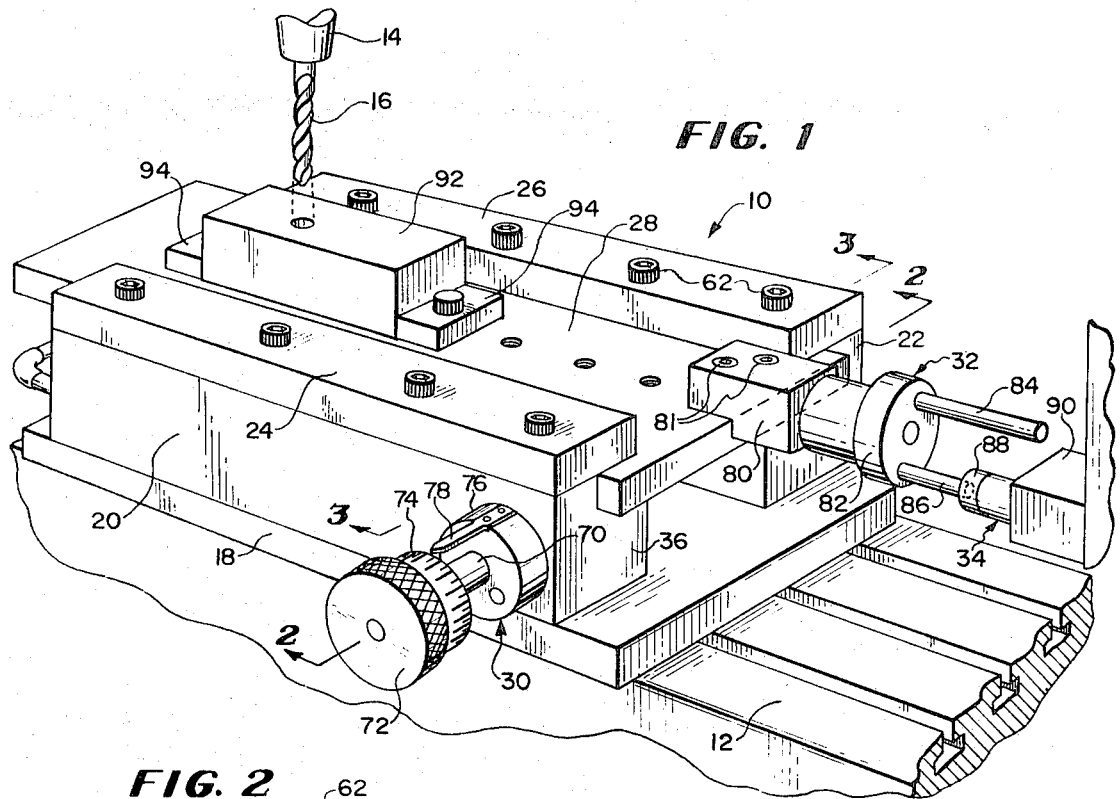
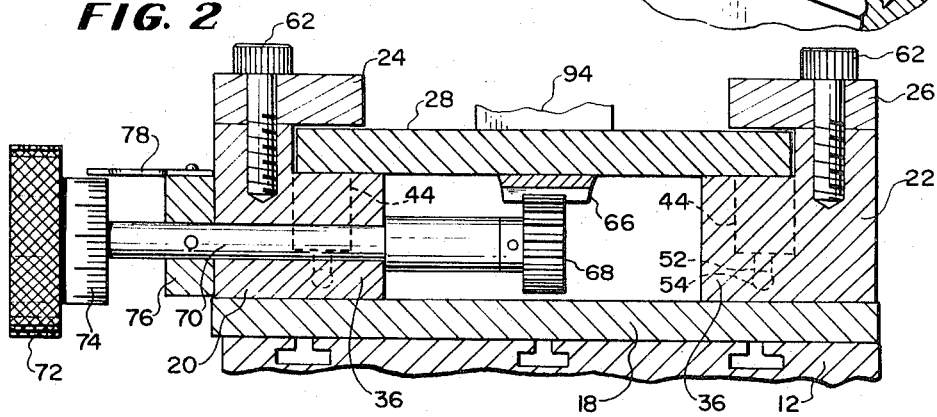
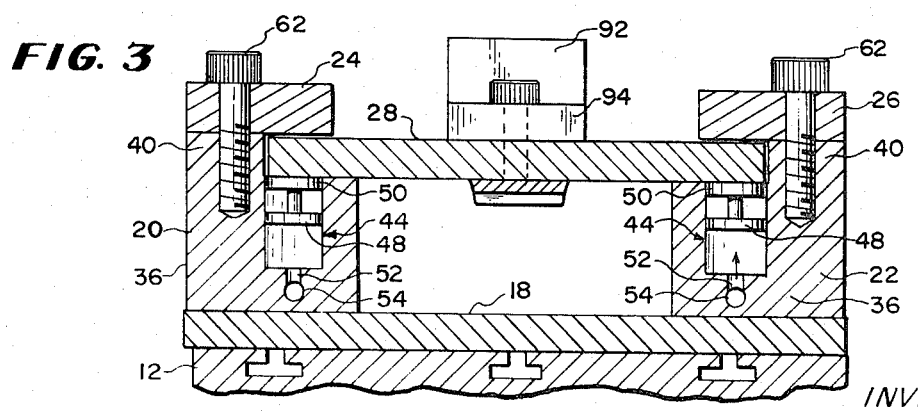

PATENTED JAN 29 1974
3,788,632
SHEET 2 OF 2
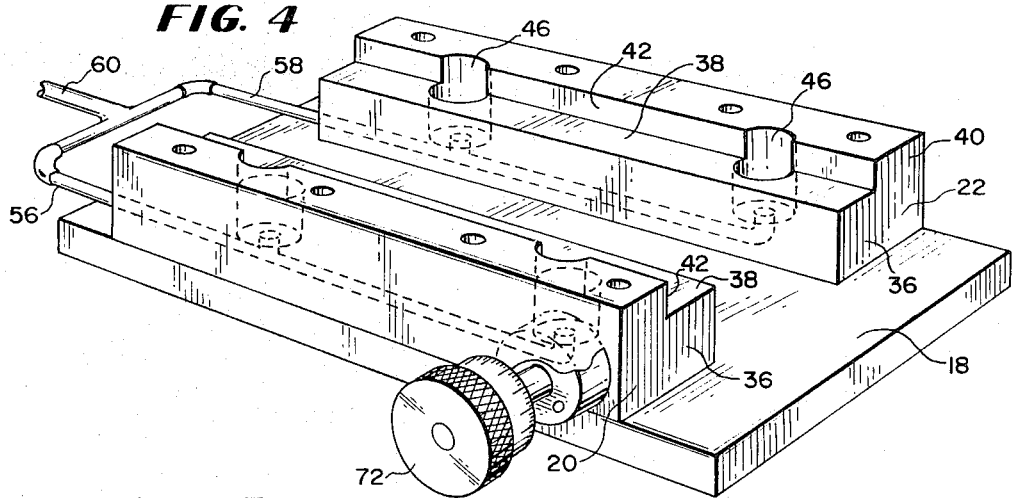
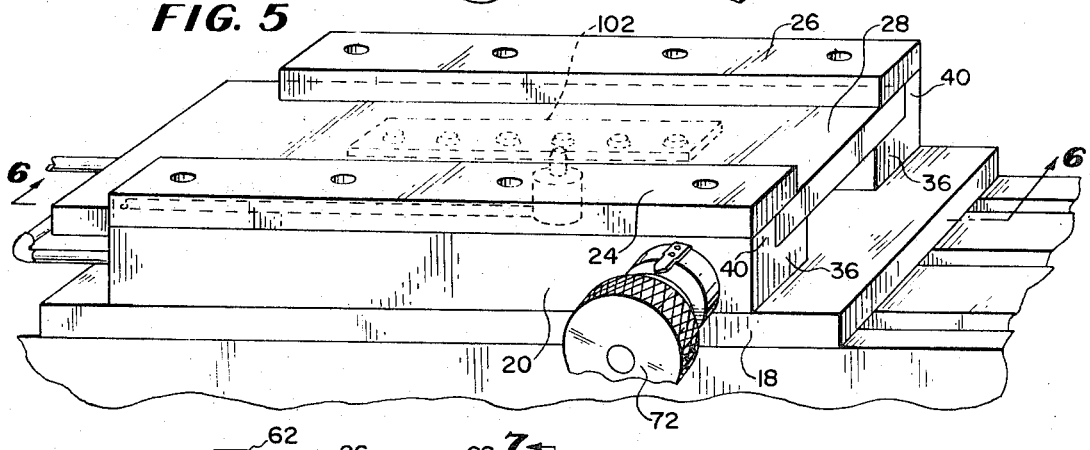
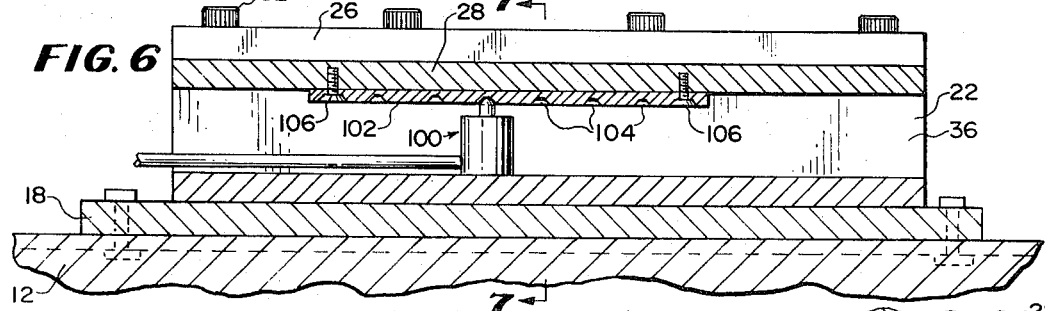
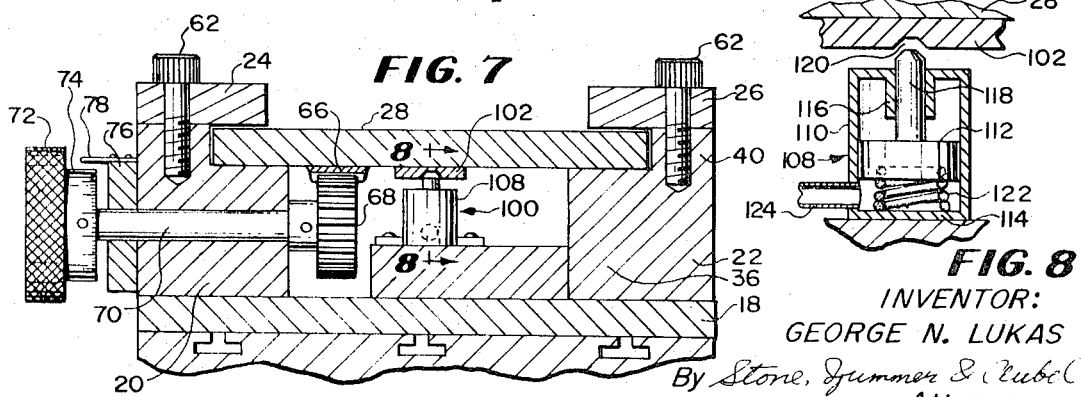
INVENTOR:
GEORGE N. LUKAS
By Stone, Zummer & Rubel
Attorneys

WORK-POSITIONING TABLE

BACKGROUND OF THE INVENTION

In a machine shop, there is often the problem of performing a number of operations on identical work pieces. In certain jobs, it is necessary to drill location holes or make cuts at various positions of a work piece. One common way of locating holes or positions for cuts is to blue a work piece, then lay out the dimensions and scribe marks in the blueing. The marks serve as the guides for the cuts to be made into the work piece. This method of laying out locations is satisfactory only for a job which demands only a few work pieces because it is time-consuming to lay out the location of various points on a work piece using gauges and calipers. When the number of work pieces to be handled is substantial enough, then a jig may be built which has locating positions to position a work tool. The manufacture of a jig is expensive, and there is the problem in using a jig since the work piece still must be moved in order to locate the jig properly relative to a work tool.

SUMMARY OF THE INVENTION

The present invention is a work-positioning table. A work piece is releasably secured to the table, and the work piece and a portion of the table are then moved in relation to a tool. The work piece is held at one or more selected positions so that once the table is adjusted, each work piece which is mounted on the table may be selectively moved to the same position relative to the tool as the previous work piece.

The construction of the present work-positioning table is such that any position may be selected within the range of the table and the work piece is held at that position without the likelihood of moving to another position. The work piece is held securely during a cutting operation and then may be readily released after cutting and moved to additional selected positions as is required. The principal object of this invention is to provide a work-positioning table which includes a carrier which may be selectively positioned and held at an infinite number of positions along the length of the movement of the carrier.

It is another object of the present invention to provide an improved work-positioning table which holds the work securely and in place but may be quickly and readily released for movement to another position as required in a machining operation.

It is a further object of the herein-disclosed invention to provide an improved work-positioning table which is economical to manufacture and easy to maintain.

Other objects and uses of the instant invention will become readily apparent to those skilled in the art upon a perusal of the following specification in light of the accompanying drawings.

BRIEF DESCRIPTION OF THE DRAWINGS

FIG. 1 is a perspective view of a work-positioning table embodying the present invention, showing a work piece mounted on a carrier plate, being in position for a cutting operation;

FIG. 2 is a cross-sectional view taken on Line 2—2 of FIG. 1;

FIG. 3 is a cross-sectional view taken on Line 3—3 of FIG. 1;

FIG. 4 is a perspective view of a base and side mounts of the table shown in FIG. 1 and showing piping connected to the side mounts;

FIG. 5 is a perspective view of a modified version of the table, showing a modified form of a position locator mounted on the table;

FIG. 6 is a cross-sectional view taken on Line 6—6 of FIG. 5;

FIG. 7 is a cross-sectional view taken on Line 7—7 of FIG. 6; and

FIG. 8 is an enlarged fragmentary cross-sectional view taken on Line 8—8 of FIG. 7, showing a portion of the position locator in greater detail.

DESCRIPTION OF THE PREFERRED EMBODIMENTS

Referring now to the drawings, and especially to FIG. 1, a work-positioning table generally indicated by the numeral 10 is shown therein, which table 10 is a specific embodiment of the instant invention. The table 10 is shown mounted on a conventional bed 12 of a machine tool, which machine tool includes a collet 14 and a drill bit 16 mounted in the collet.

The table 10 generally includes a flat base plate 18 with a pair of parallel side mounts 20 and 22 fixed to the base plate. Friction plates or holders 24 and 26 are mounted on the side mounts 20 and 22, respectively. A flat carrier plate 28 is supported by the side mounts 20 and 22 and is engageable with the friction plates 24 and 26, as will be described in greater detail below. A carrier plate drive 30 provides a means for moving the carrier plate relative to the base plate 18. A position locator or stop 32 is mounted on one end of the carrier plate and is engageable with a valve assembly 34.

The base plate 18 is conventional in its construction in that it is a flat plate which is secured to the bed 12 through conventional holders and T-slots in the bed. Mounted on the base plate are the side mounts 20 and 22. The side mounts 20 and 22 are substantially identical to each other in their construction except for the fact that they are a mirror image of each other and the side mount 20 has the carrier plate drive 30 mounted in it. The side mounts each have an elongated main body 36 with a flat support surface 38 formed thereon. A side wall 40 is formed integral with the body 36 and has a lateral guide surface 42 formed therein so that the two lateral guide surfaces of the two side mounts are parallel to each other to prevent lateral motion of the carrier plate. The support surfaces of the two side mounts are in the same plane, thereby providing a substantially flat support for the carrier plate.

Mounted in each of the side mounts is a pair of hydraulic cylinders 44. Each of the hydraulic cylinders 44 has a cylinder wall 46 which extends up through the side wall 40, as may be best seen in FIG. 4. A piston 48 is mounted within the cylinder wall in each of the cylinders. A ram 50 is connected to each of the pistons and the ram is engageable with the bottom of the carrier plate 28. Each of the cylinders has a cylinder inlet passage 52 connected to a longitudinal conduit 54. Connected to the longitudinal conduits of the side mounts 20 and 22 are pipes 56 and 58, respectively. Pipes 56 and 58 are connected to a main hose 60, which in turn is connected to a source of hydraulic fluid under pressure.

Mounted on top of the side mounts 20 and 22 are the two friction plates 24 and 26, respectively. The friction plates are held in position by a plurality of conventional machine screws 62. It is important to note that the distance between the bottom of the friction plates and the respective support surfaces of the side mounts is approximately three ten-thousandths of an inch greater than the thickness of the carrier plate, for reasons which will become apparent hereinafter.

The carrier plate drive 30 includes a rack 66 which is fixed to the bottom of the carrier plate. The rack engages a pinion 68, which pinion is in turn fixed to a pinion shaft 70. The pinion shaft 70 is rotatably mounted in the side mount 20, as may be best seen in FIG. 2, and has a knob 72 fixed to the end of the pinion shaft. A dial 74 is fixed to the shaft for rotation with the knob. A bearing 76 is fixed to the side mount 20 to support the shaft 70. The bearing 76 supports a pointer 78 whch cooperates with the dial 74 for indicating the amount of movement of the carrier plate relative to the base plate.

The stop 32 includes a stop mount 80 which is secured to the carrier plate by screws 81. The stop mount 80 has rotatably mounted thereon a turret head 82. The turret head in this instance has a pair of stop rods 84 and 86 mounted thereon, stop rod 84 being the longer rod. A valve assembly 34 is shown with a bumper 88 engageable with the stop rods 84 and 86. The bumper 88 is connected to a valve 90, which valve 90 controls the flow of hydraulic fluid to the four cylinders in the side mounts 20 and 22.

Shown mounted on the carrier plate 28 is a work piece 92 which is held in position by a pair of work clamps 94. It should be understood that a simplified version of the means for holding the work piece 92 is shown herein, and it may be readily appreciated that the carrier may be covered with a chip guard in order to prevent chips or cuttings of material from getting in between the friction plates and the carrier plate. A vise or a fixture may be similarly mounted on the carrier rather than having the work piece being held between a pair of work clamps 94.

In operation, the work-positioning table 10 operates in the following manner. First of all, the table must be adjusted for a particular job. The work piece is appropriately mounted on the carrier plate 28, and the first stop is set, that is, the position of the longer stop rod 84 is set. Then the knob 72 is rotated to move the carrier plate along the support surfaces, and the amount of motion is observed on the dial. It may be appreciated that more sophisticated measuring devices may be utilized in order to accomplish the measurement of the movement of the work piece. The shorter stop rod 86 is then appropriately set.

Once the table has been set for operation, it is only necessary for the operator to position the work piece on the carrier, turn the knob until the longer stop rod engages the bumper 88, which operates the valve 90, to allow hydraulic fluid under pressure to flow to the cylinders 44, thereby raising the pistons and the rams 50. The short distance between the support surface and the bottom of the friction plates requires only a small movement of the carrier plate vertically until the upper surface of the carrier plate engages the bottom of the friction plates. The carrier plate is thus securely held in position. The tool is brought down to make an appropriate cut on the work piece. The tool is retracted, and the turret head 82 is rotated so that the longer rod 84 disengages the bumper 82, thereby releasing the pressure from the cylinders 44 to allow the pistons 48 to move down into the cylinders. The knob 72 is than again rotated until the shorter stop rod 86 engages the bumper 88, and again the carrier plate is locked into position. The tool is brought down, and work is done on the work piece. The work piece is then retracted, and another work piece is then inserted to repeat the operation. It may be appreciated that there is no need to measure the distance between the positions where the tool is placed into engagement with the work piece since the position is located and the relative distance between the two holes is always the same. Though only two stop rods are shown and described herein, any appropriate number of stop rods may be used, depending upon the number of locations at which cuts are to be made in the work pieces.

The present work table allows the work piece to be held securely without any relative lateral motion of the work table. Since the carrier plate is held frictionally, the carrier plate may be located at an infinite number of positions. The table has a low profile, that is, the cylinders are not on top of the table but rather below it so that the table does not interfere with the operation of the tool. The table slides on the bottom of the carrier plate in engagement with the support surfaces. Thus, as the table is operated and there is constant sliding of the bottom of the carrier plate on the support surfaces and there is a constant polishing of the sliding surfaces, there may be a change in the friction between the sliding surfaces. However, the frictional surfaces between the friction plate and the carrier plate have no sliding action therebetween so that the coefficient of friction between the friction plate and the carrier plate does not change during usage of the table.

It may be appreciated that though a simplified workholding device is shown on the carrier plate, various accessories may be added. For instance, a chip guard may be mounted over the carrier plate and over the friction plates to prevent chips from working their way in between the carrier plate and the friction plate. Furthermore, a mounting plate may be attached to the carrier plate with a vise or other fixture mounted on the mounting plate for holding a work piece.

The drive 30 is shown as a manually operated rack and pinion in this specific instance. It may be appreciated that a pneumatic cylinder or other like power-operated device may be attached to the carrier plate to provide a power source for moving the carrier plate and the work piece which is mounted on the carrier plate. The operation of the cylinder may be interconnected with the operation of the work tool by appropriate valving to activate the cylinder to move the carrier plate after the tool is withdrawn from engagement with the work piece.

A modified stop may be utilized with the present work table, which stop is shown in FIGS. 5 through 8. The work table shown in FIGS. 5 through 8 is identical to that described above, and the same numbers are used throughout. However, the stop 32 is not mounted on the carrier plate, but rather a pin stop 100 is shown therein. The pin stop 100 is particularly adapted for longer production runs than the stop 32. The pin stop includes a templet 102 which has a plurality of 45° conical apertures 104 appropriately spaced along its length. The templet 102 is secured to the bottom of the carrier plate 28 by machine screws 106. A stop cylinder 108 is mounted on the base 18 to provide a means for positioning and releasably locking the carrier plate.

The cylinder 108, as may be best seen in FIG. 8, includes a tube 110 with a piston 112 mounted in the cylinder. The tube 110 has a head 114 fixed to one end and an apertured guide 116 at the other end. The piston has a positioning pin 118 fixed thereto and extending through the guide 116. The positioning pin 118 has a 45° tapered point 120 which mates with each of the apertures 104. A spring 122 is mounted between the head 114 and piston 112 to urge constantly the piston toward the guide 116 and thus urge constantly the tapered point 120 toward the templet 102. A pipe 124 is connected to the cylinder to provide a source of hydraulic fluid. The pipe 124 is larger in diameter than the conduit 54 and is connected to the hose 60 directly so that when pressure is applied through the hose 60, the cylinder 108 is activated first before the pressure builds up in cylinders 44.

In operation, the tapered point 120 is held in an aperture 104 by virtue of the force of the spring 122 once the hydraulic pressure has been relieved. The operator turns the knob 72, and the tapered point 120 is cammed out of the tapered aperture 104. The end of the tapered point then rides along the bottom of the templet 102 until the next aperture is reached. The tapered point is then forced into the next aperture, which signals the operator that the next location is reached. The operator then activates a valve, which is not shown herein, to provide hydraulic fluid to cylinder 108 and cylinders 44. As was mentioned above, the first cylinder to be activated is cylinder 108 so that the piston forces the tapered point 120 into firm engagement with the appropriate aperture 104. This firm movement of the tapered point into the aperture aligns the carrier plate to the appropriate pre-selected position. At the same time, the cylinders 44 start to raise the carrier plate into frictional engagement with friction plates 62 and 64. It is important to note the sequence in that the cylinder 108 is first activated to establish the position of the carrier plate, and then the cylinders 44 hold the carrier plate in the selected position.

The work table utilizing the pin stop 100 is used in much the same manner as the work table described with the stop 32 mounted thereon. The carrier plate has a work piece mounted thereon, which carrier plate is positioned to a given location and a tool is brought into engagement with the work piece. Upon completion of the cutting operation, the work piece is then moved to the next location for further work.

Although specific embodiments of the present invention have been shown and described in detail above, it is readily apparent that those skilled in the art may make various modifications and changes from the device as shown. It is to be expressly understood that the instant invention is limited only by the appended claims.

What is claimed is:

1. A work-positioning table of the character described comprising, a base, a work carrier having one surface movably mounted on said base, a holder mounted on said base and positioned adjacent to the work carrier and engageable with another surface of the work carrier to secure the work carrier against movement, and a ram mounted on the base releasably connectable with the carrier for moving said other surface of the carrier into secure engagement with the holder at any selected position of the carrier relative to the base.

2. A work-positioning table as described in claim 1, including a position locator connected to the carrier for positioning the carrier in a selected position relative to the base.

3. A work-positioning table of the character described comprising, a base, a work carrier movably mounted on said base, a holder mounted on said base and positioned adjacent to the work carrier, a ram mounted on the base releasably connectable with the carrier for moving the carrier into secure engagement with the holder at any selected position of the carrier relative to the base, and a position locator connected to the carrier for positioning the carrier in a selected position relative to the base, said position locator including a plurality of stop rods mounted on the carrier engageable with a fixed bumper for selectively positioning the carrier relative to the base.

4. A work-positioning table as defined in claim 2 wherein the position locator includes a locking member and a movable member engageable with the locking member to lock the carrier relative to the base.

5. A work-positioning table as described in claim 2 wherein the position locator includes a position plate connected to the carrier, a stop cylinder mounted on the base, and a position pin connected to the stop cylinder and engageable with the position plate to lock the carrier relative to the base.

6. A work-positioning table as described in claim 1, including a side mount connected to said base, said side mount having a support surface for supporting one edge of the carrier and a lateral guide surface for restricting movement of the carrier in one direction, a cylinder positioned in the side mount below the support surface and being connected to the ram, a second side mount mounted on the base parallel to the first-mentioned side mount, said second side mount having a second support surface in the same plane as the first-mentioned support surface for supporting the opposite edge of the carrier, said second side mount having a lateral guide surface parallel to the first-mentioned lateral guide surface for restricting lateral movement of the carrier in the opposite direction, a second holder mounted on the second side mount above the second support surface, a cylinder positioned in the second side mount below the support surface, and a second ram connected to the second cylinder and engageable with the carrier, said cylinders being interconnected for simultaneous operation, whereby actuation of the cylinders places the rams into engagement with the carrier to place the carrier into secure engagement with the holders.

7. A work-positioning table of the character described comprising, a base, a work carrier movably mounted on said base, a holder mounted on said base and positioned adjacent to the work carrier, a ram mounted on the base releasably connectable with the carrier for moving the carrier into secure engagement with the holder at any selected position of the carrier relative to the base, a side mount connected to said base, said side mount having a support surface for supporting one edge of the carrier and a lateral guide surface for restricting movement of the carrier in one direction, a cylinder positioned in the side mount below the support surface and being connected to the ram, a second side mount mounted on the base parallel to the first-mentioned side mount, said second side mount having a second support surface in the same plane as the first-mentioned support surface for supporting the opposite edge of the carrier, said second side mount having a lateral guide surface parallel to the first-mentioned lateral guide surface for restricting lateral movement of the carrier in the opposite direction, a second holder mounted on the second side mount above the second support surface, a cylinder positioned in the second side mount below the support surface, a second ram connected to the second cylinder and engageable with the carrier, said cylinders being interconnected for simultaneous operation, whereby actuation of the cylinders places the rams into engagement with the carrier to place the carrier into secure engagement with the holders, and a position locator connected to the carrier for positioning the carrier in a selected position relative to the base.

8. A work-positioning table of the character described comprising, a base, a work carrier movably mounted on said base, a holder mounted on said base and positioned adjacent to the work carrier, a ram mounted on the base releasably connectable with the carrier for moving the carrier into secure engagement with the holder at any selected position of the carrier relative to the base, a side mount connected to said base, said side mount having a support surface for supporting one edge of the carrier and a lateral guide surface for restricting movement of the carrier in one direction, a cylinder positioned in the side mount below the support surface and being connected to the ram, a second side mount mounted on the base parallel to the first-mentioned side mount, said second side mount having a second support surface in the same plane as the first-mentioned support surface for supporting the opposite edge of the carrier, said second side mount having a lateral guide surface parallel to the first-mentioned lateral guide surface for restricting lateral movement of the carrier in the opposite direction, a second holder mounted on the second side mount above the second support surface, a cylinder positioned in the second side mount below the support surface, a second ram connected to the second cylinder and engageable with the carrier, said cylinders being interconnected for simultaneous operation, whereby actuation of the cylinders places the rams into engagement with the carrier to place the carrier into secure engagement with the holders, and a drive for selectively moving the carrier relative to the base.

9. A work-positioning table of the character described comprising, a base, a work carrier movably mounted on said base, a holder mounted on said base and positioned adjacent to the work carrier, a ram mounted on the base releasably connectable with the carrier for moving the carrier into secure engagement with the holder at any selected position of the carrier relative to the base, a side mount connected to said base, said side mount having a support surface for supporting one edge of the carrier and a lateral guide surface for restricting movement of the carrier in one direction, a cylinder positioned in the side mount below the support surface and being connected to the ram, a second side mount mounted on the base parallel to the first-mentioned side mount, said second side mount having a second support surface in the same plane as the first-mentioned support surface for supporting the opposite edge of the carrier, said second side mount having a lateral guide surface parallel to the first-mentioned lateral guide surface for restricting lateral movement of the carrier in the opposite direction, a second holder mounted on the second side mount above the second support surface, a cylinder positioned in the second side mount below the support surface, a second ram connected to the second cylinder and engageable with the carrier, said cylinders being interconnected for simultaneous operation, whereby actuation of the cylinders places the rams into engagement with the carrier to place the carrier into secure engagement with the holders, a drive for selectively moving the carrier relative to the base, and a position locator connected to the carrier for positioning the carrier in a selected position relative to the base.

10. A work-positioning table as described in claim 1, including a fluid-operated cylinder mounted on said base and connected to the ram for moving the ram toward the carrier.

11. A work-positioning table as defined in claim 10, including a second fluid-operated cylinder mounted on the base, said second cylinder having a second ram for moving the carrier into engagement with the holder, said cylinders being balanced to apply an equal force to the carrier.

12. A work-positioning table of the character described comprising, a base, a work carrier movably mounted on said base, a holder mounted on said base and positioned adjacent to the work carrier, a ram mounted on the base releasably connectable with the carrier for moving the carrier into secure engagement with the holder at any selected position of the carrier relative to the base, a drive for selectively moving the carrier relative to the base, a position locator connected to the carrier for selectively positioning the carrier relative to the base, a side mount connected to said base, said side mount having a support surface for supporting one edge of the carrier and a lateral guide surface for restricting movement of the carrier in one direction, a cylinder positioned in the side mount below the support surface and being connected to the ram, a second cylinder positioned in the side mount below the support surface, a second ram connected to the second cylinder engageable with the carrier, a fluid conduit connecting the two cylinders to provide fluid under equal pressure to both of the cylinders, a second side mount connected to the base parallel to the first-mentioned side mount, said second side mount having a second support surface in the same plane as the first-mentioned support surface for supporting the opposite edge of the carrier, said second side mount having a lateral guide surface parallel to the first-mentioned lateral guide surface for restricting lateral movement of the carrier in the opposite direction, a second holder mounted on the second side mount above the second support surface releasably engageable with the carrier, a pair of cylinders positioned in the second side mount below the support surface, said pair of cylinders being interconnected by a second fluid conduit to have equal pressure in both cylinders, third and fourth rams connected to the second pair of cylinders and being engageable with the carrier to hold the carrier plate, a conduit interconnecting the cylinders in the first-mentioned side mount with the cylinders of the second side mount to operate all of the cylinders simultaneously, whereby actuation of the cylinders places the rams into engagement with the carrier to raise the carrier into engagement with the holders to secure frictionally the carrier against movement.

13. A work-positioning table as described in claim 12 wherein the position locator includes a position plate connected to the carrier, a stop cylinder mounted on the base, a position pin connected to the stop cylinder and engageable with the position plate to lock the carrier relative to the base, and a stop cylinder conduit connected to the conduit interconnecting the cylinders of the side mounts, said conduit to the stop cylinder having a larger internal cross-sectional area than the internal cross-sectional area of the conduit to the pair of cylinders, whereby the application of fluid under pressure causes the stop cylinder to be actuated prior to actuation of the other cylinders.

14. A work-positioning table as described in claim 1, including a drive for selectively moving the carrier relative to the base.

15. A work-positioning table as described in claim 1, including a drive for selectively moving the carrier relative to the base, and a position locator connected to the carrier for positioning the carrier in a selected position relative to the base.

* * * * *